March 24, 1964     D. H. BOLLINGER, JR     3,126,227
SAFETY SEAT BELT DEVICE

Filed March 8, 1962     3 Sheets-Sheet 1

INVENTOR.
DANIEL H. BOLLINGER, JR.
BY Hobbs & Easton
ATTORNEYS

March 24, 1964  D. H. BOLLINGER, JR  3,126,227
SAFETY SEAT BELT DEVICE
Filed March 8, 1962  3 Sheets-Sheet 2

INVENTOR.
DANIEL H. BOLLINGER, JR.
BY *Hobby & Castor*
ATTORNEYS

March 24, 1964 D. H. BOLLINGER, JR 3,126,227
SAFETY SEAT BELT DEVICE
Filed March 8, 1962 3 Sheets-Sheet 3

INVENTOR.
DANIEL H. BOLLINGER, JR.
BY *Hobbs & Easton*
ATTORNEYS

United States Patent Office 3,126,227
Patented Mar. 24, 1964

3,126,227
SAFETY SEAT BELT DEVICE
Daniel H. Bollinger, Jr., 524 W. Plymouth St.,
Bremen, Ind.
Filed Mar. 8, 1962, Ser. No. 178,404
4 Claims. (Cl. 297—385)

The present invention relates to a safety device and more particularly to a seat belt construction for use primarily in automobiles, trucks and similar vehicles.

The type of seat belt in general use in passenger cars today consists principally of two straps anchored to the floor of the automobile and being buckled together at the front of the occupant. The buckle usually consists of two parts, one part being secured permanently and securely to one strap by stitching and the other part being adjustably secured to the other strap. This type of seat belt has a number of inherent disadvantages or features which render it unsatisfactory, unsafe and/or uncomfortable. For example, the buckle resting on the occupant often becomes a burden and creates discomfort, particularly when the belt is worn for long periods of time, and is a hazard to the occupant in the event of an accident in that it in itself may become an instrument for injuring the body. Further, the buckle being in the center and easily reachable creates a temptation to children to play with the buckle while the belt is in use, and consequently occasionally unintentionally and unknowingly results in accidental unbuckling, thus rendering the belt ineffective in the event of an accident. The stitching used in securing the permanently attached buckle to the strap also causes difficulty in that it becomes frayed and may fail under pressure and thus cause the seat belt to fail in an accident. Still another disadvantage in this generally used type of seat belt is that the strap next to the door often falls out the door when the door is opened and is caught in the door when it is shut, resulting in damage to the belt and/or door. It is therefore one of the principal objects of the present invention to provide a new type of seat belt which utilizes only one strap extending from the center of the seat to the outside edge with a single buckle placed at the end thereof and at the side of the occupant where it can not interfere with his safety and comfort, yet where it can be easily reached and readily released when the occupant wishes to leave the vehicle.

Another object of the invention is to provide a seat belt having a single strap and a single buckle in which no stitching is used to secure the buckle to the strap.

Still another object of the invention is to provide a seat belt which can be easily adjusted to any person and which can be secured in place around the person without wrinkling, bunching or damaging the person's clothing.

A further object is to provide a seat belt construction which is virtually tamper-proof as far as little children are concerned, and will remain in place until it is intentional and deliberately released, and which will not be unintentionally released by the occupant while shifting his position and moving his arms while riding in the vehicle, and will fold effectively out of the way of the occupant when it is not in use.

In order to assist and encourage the occupants to use the seat belts at all times, the present invention incorporates a signal or warning system which indicates to the driver of the particular automobile and/or the persons remote from the automobile, such as drivers in passing automobiles or traffic police, whether the seat belts are in use. This readily permits the driver to always check seat belts of the other occupants of the vehicle. It is therefore another object of the invention to provide a relatively simple and reliable signal system for seat belts which can be readily incorporated in most types of seat belts and particularly in the type of seat belt disclosed in detail herein.

Additional objects and advantages of the invention will become apparent from the following description and accompanying drawings, wherein.

Figure 1:
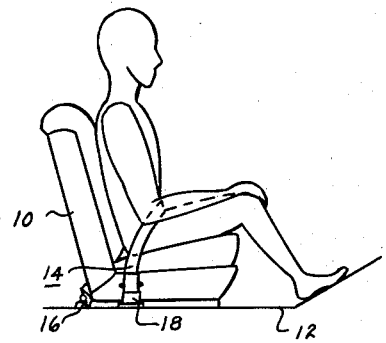
FIGURE 1 is an elevational view of an automobile seat showing a person held therein by the present seat belt.
Figure 4:
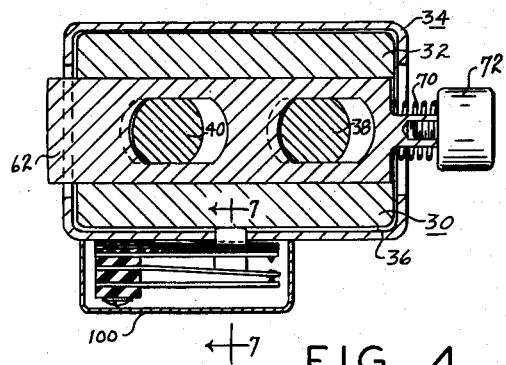
FIGURE 4 is a horizontal cross sectional view through the buckle and anchoring structure shown in FIGURES 2 and 3, the section being taken on line 4—4 of FIGURE 2.

Referring more specifically to the drawings and to FIGURE 1 in particular, numeral 10 designates a conventional front seat of an automobile the floor of which is indicated at numeral 12, numeral 14 indicating generally the present seat or safety belt secured at one end to the floor by a suitable anchoring means 16 and at the other end by the present buckle and anchoring structure indicated in combination with numeral 18. The strap passes over the lap or lower portion of the body of the occupant shown sitting in normal position in the seat. While the present seat belt is shown used in conjunction with the front seat of the automobile on the right side thereof, the belt may readily be used without change in any one of the other normal riding positions in the car seats, both front and back, the only change required being in the positioning of the anchoring means 16 and anchoring structure 18.

The inner end of strap 22 passes beneath the back portion of the seat to an anchor means 16, to which it is permanently attached and which in turn is firmly anchored to the floor, preferably by bolts passing downwardly through the floor of the car. A number of anchoring means of well known construction are presently available on the market, which can be used satisfactorily with the present seat belt, and hence the one shown will not be described in detail herein. The anchoring means 16 is positioned near the center of the front seat, and the strap passes beneath the seat and back portions near the center thereof and then over the lower portion of the occupant's body to the anchoring structure 18. When the belt is disengaged, it is lifted inwardly over the occupant's body and placed on the seat near the center thereof.

Figures 2, 3:
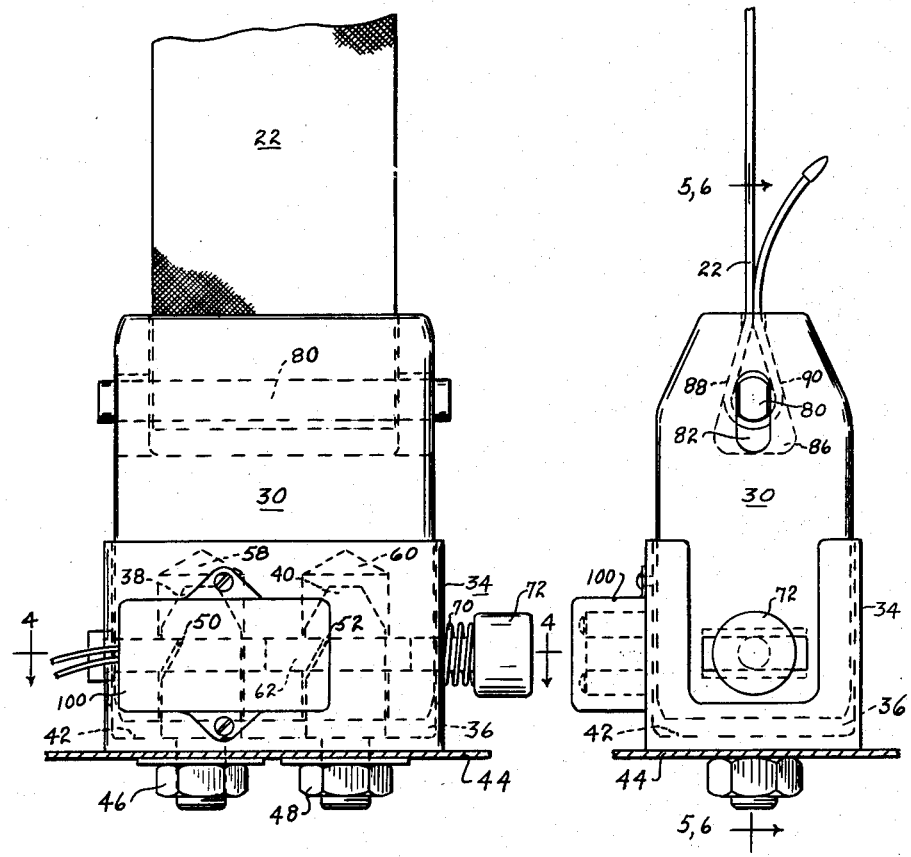
FIGURE 2 is a side elevational view of the present seat belt buckling and anchoring structure, showing only a fragmentary portion of the strap and the anchoring structure secured to the automobile floor.
FIGURE 3 is a side elevtional view of the buckling and anchoring structure shown in FIGURE 2.
Figure 6:
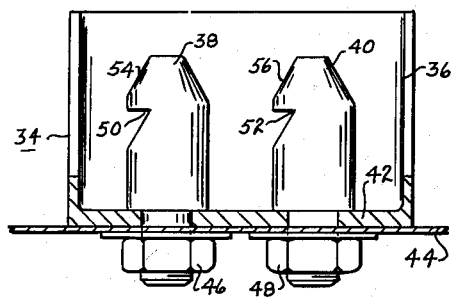
FIGURE 6 is a vertical cross sectional view through the anchoring structure shown in FIGURES 2 and 3, the section being taken on line 6—6 of FIGURE 3.

The embodiment of the present buckle and anchoring structure shown in FIGURE 2 includes a buckle 30 having a body 32, preferably of aluminum, and the anchoring structure 34 consists of a socket 36 adapted to receive body 32 and having two upstanding spaced posts 38 and 40 extending downwardly through the bottom 42 of socket 36 and through the automobile floor 44. Nuts 46 and 48 are threadedly received on the lower ends of posts 38 and 40 and hold the posts rigidly in fixed position in socket 36. The two posts are provided with modified V-shaped notches 50 and 52, respectively, the upper edges of the two notches being substantially horizontal, and the upper ends of the posts having tapered portions 54 and 56, respectively, for reasons which will be more fully explained hereinafter.

Figure 5:
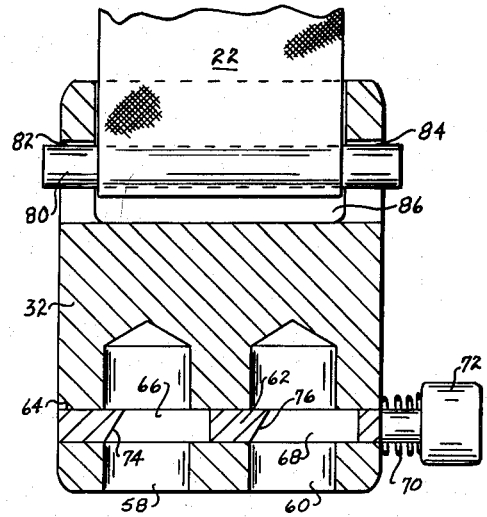
FIGURE 5 is a vertical cross sectional view through the buckle shown in FIGURES 2 and 3, and detached from the anchoring structure, the section being taken on line 5—5 of FIGURE 3.

Body 32 is provided with two upwardly extending holes 58 and 60 for receiving posts 38 and 40, and contains a slide member 62 disposed in a horizontal slot 64. The slide member is provided with openings 66 and 68 through which posts 38 and 40 pass when body 32 is pressed downwardly over the posts in socket 36. Slide member 62 is urged to the right, as shown in FIGURE 5, by a coil spring 70 reacting against the adjacent end of body 32 and an operating button 72 on the end of member 62. The edges on the left hand side thereof, as viewed in FIGURE 5, taper inwardly and upwardly at numerals 74 and 76, respectively, so that the slide member will be urged leftwardly as the body is pushed down over the tapered end portion of the posts to permit the posts to pass through openings 66 and 68, and thereafter to permit the upper surface of slide member 62 to engage the upper edges of slots 50 and 52 to lock the body firmly in socket 36.

The strap is adjustably secured to body 32, by a rod 80 extending horizontally and lengthwise through the body and outwardly through slots 82 and 84 on opposite sides of the body. The strap 22 extends into recess 86 through which rod 80 passes, loops around the rod and outwardly through the top of the recess in the manner best illustrated in FIGURE 3. As tension is placed on belt 22, rod 80 is drawn up until the belt is securely wedged between inner tapered surfaces 88 and 90 of recess 86, thus locking the belt in its adjusted position. In order to adjust the belt to any desired length, the occupant of the seat merely presses rod 80 downwardly until the belt is no longer in firm contact with sides 88 and 90. The belt is then slipped to the desired position, either lengthening or shortening it, and then rod 80 is released, permitting the tension on the belt to lock it in place again against tapered edges 88 and 90.

In the use of the present seat and safety belt, the occupant first becomes properly positioned in the seat and then moves the belt from the center of the seat over the edge to the anchoring structure 34, and slips body 32 into socket 36, pressing the body downwardly over posts 38 and 40 until slide member 62 seats in slots 50 and 52 of the two posts, thus locking the buckle 30 firmly in anchoring structure 34. When it is desired to release the seat belt, the occupant merely pushes button 72 inwardly, compressing spring 70 and releasing slide member 62 from notches 50 and 52, permitting the buckle to be easily lifted from the anchoring structure.

Figure 8:
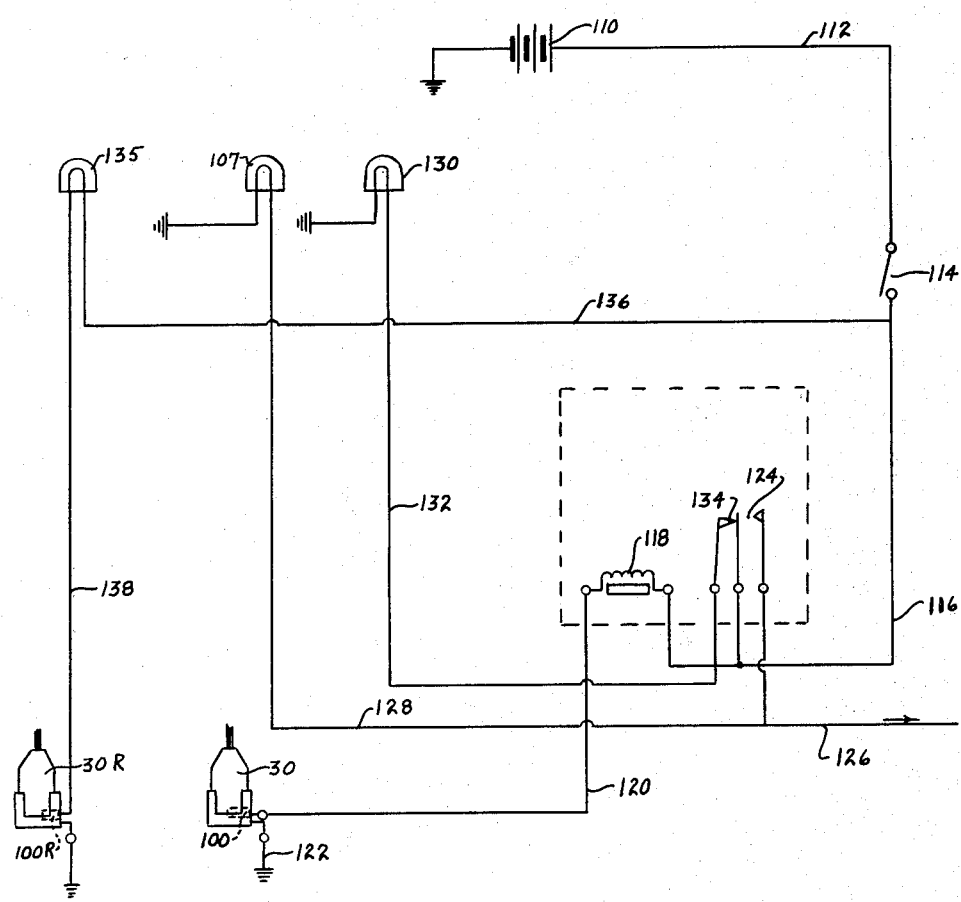
FIGURE 8 is a schematic diagram of the circuitry for the signaling or warning system, indicating whether the seat belt buckle is secured to the anchor structure.

A signal or warning system is preferably used in conjunction with the seat belt, the system shown consisting of a switch 100 mounted on the side of anchoring structure 34, and having an operating lever 102 extending inwardly into socket 36 where it is readily engaged by body 32 when the body is pressed downwardly into the socket. The operating lever throws switch blade 104 into contact with blade 106, which closes the circuit to a signal 107, preferably a green light, or other type of signal. Referring to the circuitry shown in FIGURE 8, the automobile battery is shown at numeral 110, connected to switch 100 by a lead 112, ignition switch 114, relay 118, and lead 120. The switch is connected to ground by lead 122. Relay 118 closes switch 124 which controls the lead 126 to the automobile ignition and the lead 128 to signal light 107. With this system, in order to start the engine, ignition switch 114 is closed and the belt buckle is placed in socket 36, thus closing switch 100, which in turn energizes relay 118 to close switch 124, thus completing the circuit from battery 110 through leads 112, 116 and 126 to the ignition and simultaneously closing the circuit through leads 112, 116 and switch 124 and lead 128 to signal light 107. This circuitry remains in this position until the ignition switch is either opened or buckle 30 is removed from socket 36, causing switch 100 to open, thereby deenergizing relay 118 and opening switch 124. When switch 100 is open, warning light 107 goes off, and the engine is immediately stopped. The circuitry also preferably includes a red warning light 130 which is connected by lead 132 and switch 134 and lead 116 to ignition switch 114. When relay 118 is energized by the closing of switches 100 and 114, switch 124 is closed, turning on green light 107, and switch 134 is opened, thus turning off red light 130. A green signal light 135 is controlled by ignition switch 114 and switch 100R operated by the rear seat buckle 30R, the light being connected to the ignition switch by lead 136 and to switch 100R by lead 138.

In order to induce the occupants of an automobile to use the seat belts and to permit the driver to check on the use of the belts by the other occupants, lights 130 and 135 should be placed where the driver can easily see them. Light 107 is placed where it can readily be seen by traffic officers in order to assist in the enforcement of laws and regulations requiring the use of seat belts.

Figure 9:
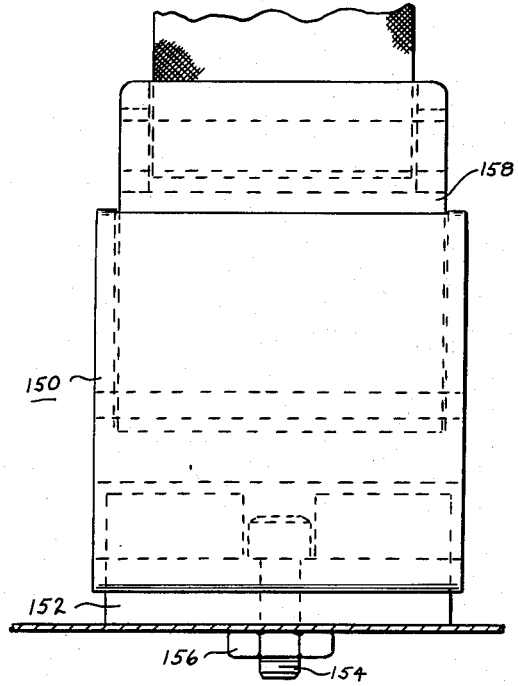
FIGURE 9 is a side elevational view of a modified form of the present invention showing the buckle and anchoring structure engaged and a portion of the strap to which the buckle is attached.
Figure 10:
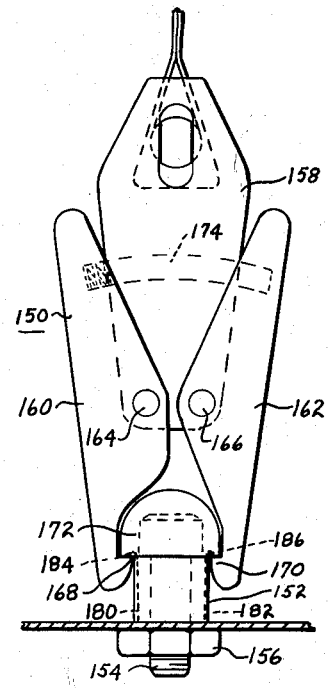
FIGURE 10 is an end elevational view of the buckle and anchoring structure shown in FIGURE 9.
Figure 7:
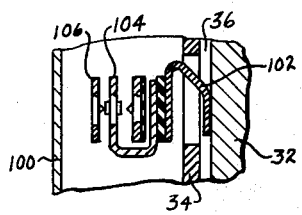
FIGURE 7 is a fragmentary cross sectional view through the switch mechanism on the anchoring structure for indicating whether the buckle is secured to said structure, the section being taken on line 7—7 of FIGURE 4.

Referring to the embodiment shown in FIGURES 9 and 10, numeral 150 designates a buckle and 152 an anchoring structure, the anchoring structure or post being secured to the floor by a bolt 154 extending downwardly through the anchoring structure and the floor, and secured in place by a nut 156. The buckle consists of a body portion 158, having mounted thereon two pivoted side members 160 and 162, the members being pivoted to the lower portion of body 158 by pins 164 and 166, respectively, extending lengthwise through body 158. The lower ends of members 160 and 162 have inwardly projecting portions 168 and 170, which engage the lower side of head 172 of anchoring structure 152. The upper ends of members 160 and 162 are positioned outwardly from the sides of body 158, and are pressed inwardly in opposition to spring 174 in body 158, in order to disengage portions 168 and 170 from the underside of head 172.

In using the modified buckle and anchoring structure, the buckle 150 is pressed downwardly over head 172, the lower edges of members 160 and 162 being pressed outwardly by the curved surface of the head until portions 168 and 170 can snap beneath the head. When these two portions are in the position shown in FIGURE 10, the buckle is held rigidly in place on the anchoring structure and can be released only by pressing the upper portions of members 160 and 162 inwardly to disengage portions 168 and 170 from the lower side of the head.

In this modified form, the circuitry for the signaling system may be the same as or similar to that previously described with reference to the first embodiment disclosed herein. However, in the modified form the buckle parts form a portion of the switching mechanism, including lead wires 180 and 182 and contacts 184 and 186. When members 160 and 162 are pressed downwardly over head 172, portions 168 and 170 engage contacts 184 and 186, completing the circuit from lead wire 180 through contact 184, member 160, body 158, member 162, contact 186 and to lead 182. The modified form is installed in very much the same manner as the first embodiment disclosed herein with the inner end of strap 22 passing between the back and seat portions of the seat downwardly to the floor where it is firmly anchored.

While only two embodiments of the present invention have been described in detail herein, various other modifications and changes may be made to adapt the seat belt to various cars and car constructions and to the front and back seats of various makes of automobiles. Although the description has been directed primarily to passenger automobiles, the present seat belts can readily be adapted to a variety of different uses, including trucks, buses, and planes, without departing from the scope of the invention.

I claim:

1. A safety device for the occupants of a vehicle, comprising a strap having at one end an anchor means to secure the respective end to the vehicle and at the other end a releasable securing means including a socket with two upstanding posts anchored to the floor of the vehicle and having notches therein, a buckle having a pair of holes therein for receiving said posts and a slot intersecting said holes, a slide in said slot with holes for receiving said posts and edge portions for seating in the notches in said posts, a spring urging said slide in the direction to seat in said notches, and a stem for moving said slide in the direction to disengage said slide from said posts.

2. A safety device for the occupants of a vehicle, comprising a strap having at one end an anchor means to secure the respective end to the vehicle and at the other end a releasable securing means including an upstanding post having a notch therein, a buckle with a hole therein for receiving said post and a slot intersecting said hole, a slide in said slot having an edge portion for seating in the notch in said post, and a signal system including a circuit having a switch actuated by said buckle to complete the circuit to a warning light and to the ignition of the vehicle engine.

3. A safety device for the occupants of a vehicle, comprising a strap having at one end an anchor means to secure the respective end to the vehicle and at the other end a releasable securing means including an upstanding post having a notch therein, a buckle with a hole therein for receiving said post and a slot intersecting said hole, a slide in said slot having an edge portion seating in the notch in said post, a spring urging said slide in the direction to seat in said notch, and a means for moving said slide in the direction to disengage said slide from said post.

4. A safety device for the occupants of a vehicle, comprising a strap having at one end an anchor means to secure the respective end to the vehicle and at the other end a releasable securing means including an anchoring structure with a fixed post having a shoulder thereon and being connected to the vehicle, a buckle including a body embracing said post and having a releasable latch means for snapping beneath said shoulder when said body is slipped downwardly over said post, and a signal system including a circuit and a switch in said circuit mounted on and confined to said anchoring structure and actuated by the engagement of said buckle with and disengagement of said buckle from said anchoring structure to operate a warning light.

References Cited in the file of this patent

UNITED STATES PATENTS

| | | |
|---|---|---|
| 2,510,115 | Jakosky | June 6, 1950 |
| 2,775,288 | Anastasia | Dec. 25, 1956 |
| 2,864,437 | Spring | Dec. 16, 1958 |
| 2,868,309 | Burgess | Jan. 13, 1959 |
| 2,880,788 | Phillips | Apr. 7, 1959 |
| 2,880,789 | Leibinger | Apr. 7, 1959 |
| 3,043,625 | Bohlin | July 10, 1962 |